(12) United States Patent
Honda (10) Patent No.: US 8,588,601 B2
(45) Date of Patent: Nov. 19, 2013

(54) DRIVE CONTROL APPARATUS, IMAGE PICKUP APPARATUS, AND DRIVE CONTROL METHOD WHICH PERFORM MICRO STEP DRIVE OF STEPPING MOTOR

(75) Inventor: Hirofumi Honda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 12/971,509

(22) Filed: Dec. 17, 2010

(65) Prior Publication Data

US 2011/0158626 A1    Jun. 30, 2011

(30) Foreign Application Priority Data

Dec. 24, 2009    (JP) ................................. 2009-293209

(51) Int. Cl.
*G03B 13/34*    (2006.01)

(52) U.S. Cl.
USPC ......................................... 396/133; 348/345

(58) Field of Classification Search
USPC ......................................... 396/133; 348/345
See application file for complete search history.

(56) References Cited

U.S. PATENT DOCUMENTS

| 6,356,307 | B2  |   | 3/2002  | Ohkawara et al. |          |
|-----------|-----|---|---------|-----------------|----------|
| 6,430,368 | B1  | * | 8/2002  | Hata ...............................| 396/79   |
| 6,670,783 | B2  |   | 12/2003 | Waehner et al.  |          |
| 2008/0013972 | A1 |   | 1/2008  | Matsuda         |          |
| 2008/0124068 | A1 | * | 5/2008  | Kwon et al. ...................| 396/127  |
| 2009/0175611 | A1 | * | 7/2009  | Kiyamura et al. ............| 396/133  |
| 2009/0218979 | A1 | * | 9/2009  | Yamasaki et al. ............| 318/600  |

FOREIGN PATENT DOCUMENTS

| JP | 01-218393    |   | 8/1989 |
|----|--------------|---|--------|
| JP | 2008-020730  | A | 1/2008 |
| JP | 2009-211734  | A | 9/2009 |
| KR | 10-0173158   | B1| 5/1999 |

OTHER PUBLICATIONS

The above references were cited in a Apr. 28, 2011 European Search Report which is enclosed of the counterpart European Patent Application No. 10194727.3.
The above references were cited in a Feb. 15, 2013 Korean Office Action, which is enclosed without English Translation, that issued in Korean Patent Application No. 10-2010-0126093.

* cited by examiner

*Primary Examiner* — Christopher Mahoney
*Assistant Examiner* — Fang-Chi Chang
(74) *Attorney, Agent, or Firm* — Cowan, Liebowitz & Latman, P.C.

(57) ABSTRACT

A drive control apparatus 118 includes a stepping motor 111-*a* capable of performing a micro step drive having a predetermined division number by using a sinusoidal excitation current, a transmission mechanism 111-*c*, 111-*d* configured to transmit an energy generated by a drive of the stepping motor to a focus lens 105 to move the focus lens 105, and a controller 111-*b* configured to control the stepping motor 111-*a* so that the number of micro steps in a micro step drive having the predetermined division number in a drive crossing a first phase is smaller than the number of micro steps in a drive crossing a second phase where a rotation angle of the stepping motor 111-*a* is smaller than a rotation angle in the first phase.

5 Claims, 7 Drawing Sheets

DRIVE CONTROL APPARATUS, IMAGE PICKUP APPARATUS, AND DRIVE CONTROL METHOD WHICH PERFORM MICRO STEP DRIVE OF STEPPING MOTOR

BACKGROUND OF THE INVENTION

1. Field of the Invention

The present invention relates to a drive control apparatus, an image pickup apparatus, and a drive control method, and more particularly to a technology of performing a micro step drive of a stepping motor.

2. Description of the Related Art

In an image pickup apparatus such as a video camera or a digital camera, a stepping motor is widely adopted as a mechanism for driving a focus lens or a zoom lens. A rotation power of the stepping motor is transmitted to the lens via a transmission mechanism constituted of a screw shaft and a rack engaging with it, and it becomes a power source of the lens in an optical axis direction.

In an AF (autofocus) control of the video camera or the digital camera, a TV-AF method is widely adopted. The TV-AF method detects a signal obtained by extracting a high frequency component in a predetermined range of a taken image as an AF evaluation value to control a movement of the focus lens so that the AF evaluation value is maximized. In the TV-AF method, a repeating motion of a minute movement in both directions of a telephoto side and a wide angle side of the focus lens (hereinafter, referred to as a "wobbling") is repeated to detect a position of the focus lens where the AF evaluation value is maximized.

As a drive method of the stepping motor for the AF control of the TV-AF method, a micro step drive method is widely adopted. The micro step drive method uses an excitation current having a sinusoidal waveform to realize a drive with steps (micro steps) in which one step (the minimum rotation angle) of the stepping motor is finer.

However, in the micro step drive method, the rotation angle in each micro step varies in accordance with a phase of the excitation current (hereinafter, referred to as a "step phase"). The cause of the variation is that a magnetic attractive force pulsates by a bias of a magnetic flux distribution of a permanent magnet that is a rotor of the stepping motor (hereinafter, referred to as "cogging"). The variation of the rotation angle in each step phase by the cogging causes the variation of movement amplitude of the focus lens at the time of the wobbling operation. As a result, a problem described below may be generated.

When a wobbling width (the number of driven micros steps) is determined on the basis of a step phase where a rotation angle is small, an amount of movement of the focus lens may be equal to or larger than a depth of field in the wobbling operation in a step phase where the rotation angle is large. This causes a float of an in-focus state. On the other hand, the wobbling width is determined on the basis of a step phase where the rotation angle is large, a so-called step-out may be generated since kinetic energy for a minute movement of the focus lens cannot be obtained in the wobbling operation in the step phase where the rotation angle is small.

Japanese Patent Laid-Open No. 01-218393 proposes a correction of a waveform of an excitation current referring to a correction table so that a rotation angle in each step phase becomes constant.

However, for the reason below, the proposal in Japanese Patent Laid-Open No. 01-218393 is not necessarily suitable for the image pickup apparatus such as a video camera or a digital camera. In other words, a bias of a magnetic flux distribution of a permanent magnet has a strong temperature dependency, but a static correction using a correction table effectively functions only at a specific temperature. Therefore, it is not suitable for the video camera or the digital camera that is used in an environment which dynamically changes. When a waveform of an excitation current is corrected, it causes the generation of a motor vibration sound at the time of inversing a rotation direction in a control which reverses the wobbling such as an AF control because a phase difference between stop positions in a positive direction and an inverse direction is generated. Accordingly, the proposal in Japanese Patent Laid-Open No. 01-218393 is not suitable for the video camera or the digital camera that stores a voice.

SUMMARY OF THE INVENTION

The present invention eases a problem caused by a variation of a rotation angle of a stepping motor in each micro step in accordance with a step phase.

A drive control apparatus as one aspect of the present invention includes a stepping motor capable of performing a micro step drive having a predetermined division number by using a sinusoidal excitation current, a transmission mechanism configured to transmit an energy generated by a drive of the stepping motor to a focus lens to move the focus lens, and a controller configured to control the stepping motor so that the number of micro steps in a micro step drive having the predetermined division number in a drive crossing a first phase is smaller than the number of micro steps in a drive crossing a second phase where a rotation angle of the stepping motor is smaller than a rotation angle in the first phase.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

First Embodiment

Figure 1:
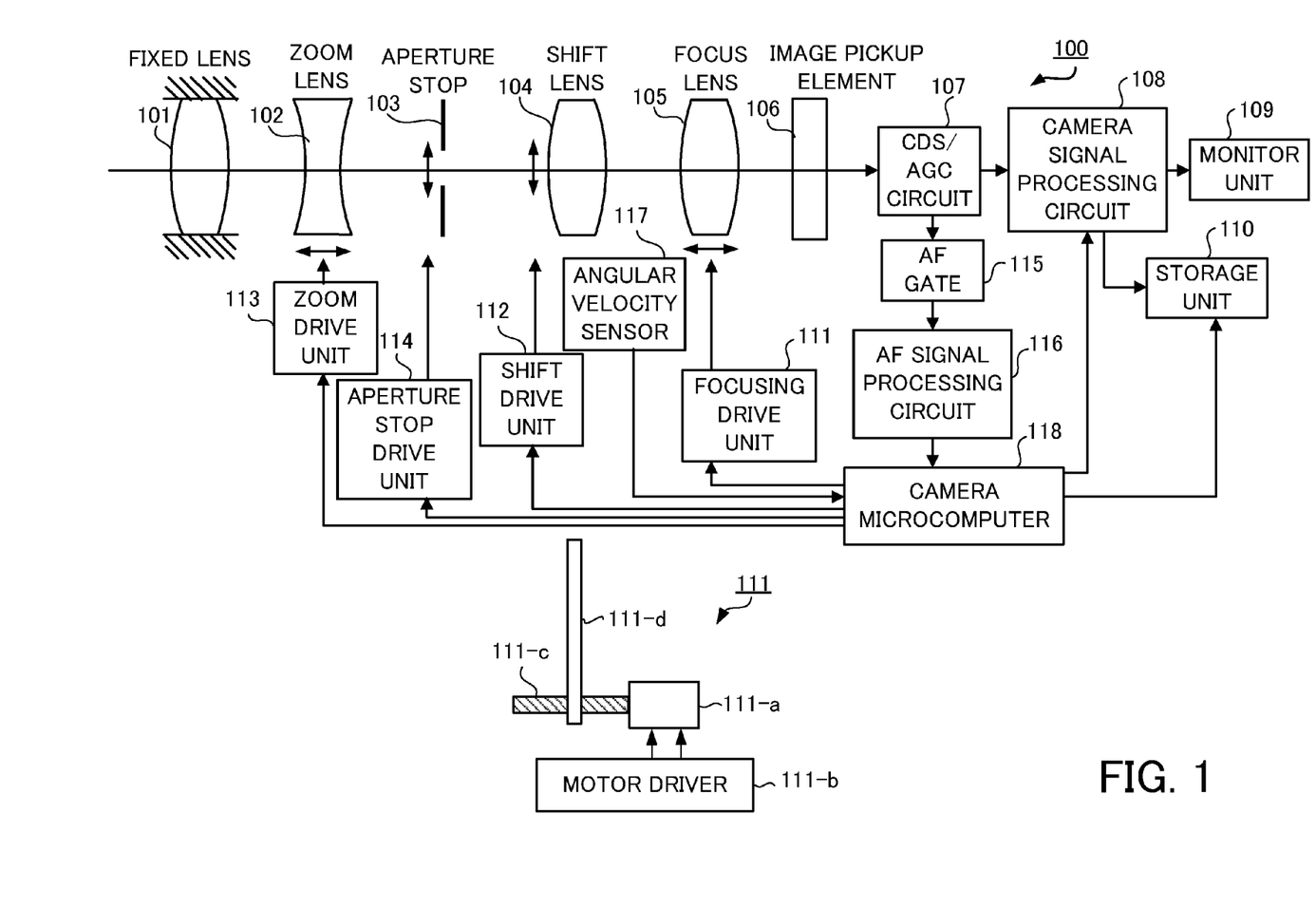
FIG. 1 is a block diagram illustrating a configuration of an image pickup apparatus 100 in a first embodiment.

FIG. 1 is a block diagram illustrating a configuration of an image pickup apparatus 100 in a first embodiment. In FIG. 1, an image pickup optical system (an imaging lens) of the image pickup apparatus 100 includes a fixed lens 101, a zoom lens 102 that moves in an optical axis direction to perform zoom operation, and an aperture stop 103. The image pickup optical system also includes a shift lens 104 that moves in a direction perpendicular to an optical axis to deflect the optical axis to compensate the motion of an image caused by a shake. The image pickup apparatus 100 includes an angular velocity sensor 117 as a shake detector. Furthermore, the image pickup optical system includes a focus compensator lens (hereinafter, referred to as a "focus lens") that has a function of correcting a movement of a focal plane caused by the zoom operation and a function of focusing operation. In the present embodiment, the image pickup optical system is integrally configured, but it may also be detachable. In this case, a control signal generated by a camera microcomputer 118 described below is communicated with a lens computer in the image pickup optical system to control the drive of the focus lens via the lens computer.

The image pickup apparatus 100 also includes an image pickup element 106 as a photoelectric conversion element which is configured by a CCD sensor or a CMOS sensor, and a CDS/AGC circuit 107 which samples an output of the image pickup element 106 to perform a gain adjustment.

A camera signal processing circuit 108 performs each kind of image processings for an output signal from the CDS/AGC circuit 107 to generate a video signal. A monitor unit 109 is constituted of a LCD or the like, and displays the video signal from the camera signal processing circuit 108. A storage unit 110 stores the video signal from the camera signal processing circuit 108 in a storage media such as a semiconductor memory.

A focusing drive unit 111, a shift drive unit 112, a zoom drive unit 113, and an aperture stop drive unit 114 drives the focus lens 105, the shift lens 104, the zoom lens 102, and the aperture stop 103, respectively. As illustrated in a lower side of FIG. 1, the focusing drive unit 111 includes a stepping motor 111-a and a motor driver 111-b (including a screw shaft (a feed screw) 111-c). The screw shaft 111-c engages with a rack 111-d which is provided on the focus lens 105. A power of the stepping motor 111-a (an energy generated by the drive) is transmitted as a power that moves the focus lens 105 via the screw shaft 111-c and the rack 111-d engaging with it, both of which function as a transmission mechanism. The other drive units are also constituted as similarly to the focusing drive unit 111.

An AF gate 115 only passes a signal in a range that is used for focus detection of output signals of all pixels from the CDS/AGC circuit 107. An AF signal processing circuit 116 extracts a high-frequency component, a luminance difference component (a difference between the maximum value and the minimum value of a luminance level of a signal that passes through the AF gate 115), or the like from the signal that passes through the AF gate 115 to generate an AF evaluation value signal. The AF evaluation value signal represents sharpness (a contrast state) of a video that is generated based on the output signal from the image pickup element 106, but the sharpness is changed in accordance with an in-focus state of the image pickup optical system, and therefore as a result it is a signal that represents the in-focus state of the image pickup optical system. The camera microcomputer 118 controls the movements of the zoom lens 102, the shift lens 104, and the focus lens 105, and the opening and closing of the aperture stop 103.

Hereinafter, a drive control of the stepping motor in the present embodiment will be described using a case of an autofocus control which is performed by the camera microcomputer 118 (a drive control unit) and a focusing drive unit 111 as an example. In the embodiment, as the autofocus control that is performed by moving the focus lens 105, a focus control by a TV-AF method (hereafter, referred to as a "TV-AF") is adopted. In the TV-AF, the focus lens 105 is moved so that the AF evaluation value becomes the maximum value while the focus lens is being wobbled to be able to focus on an object.

Figure 2:
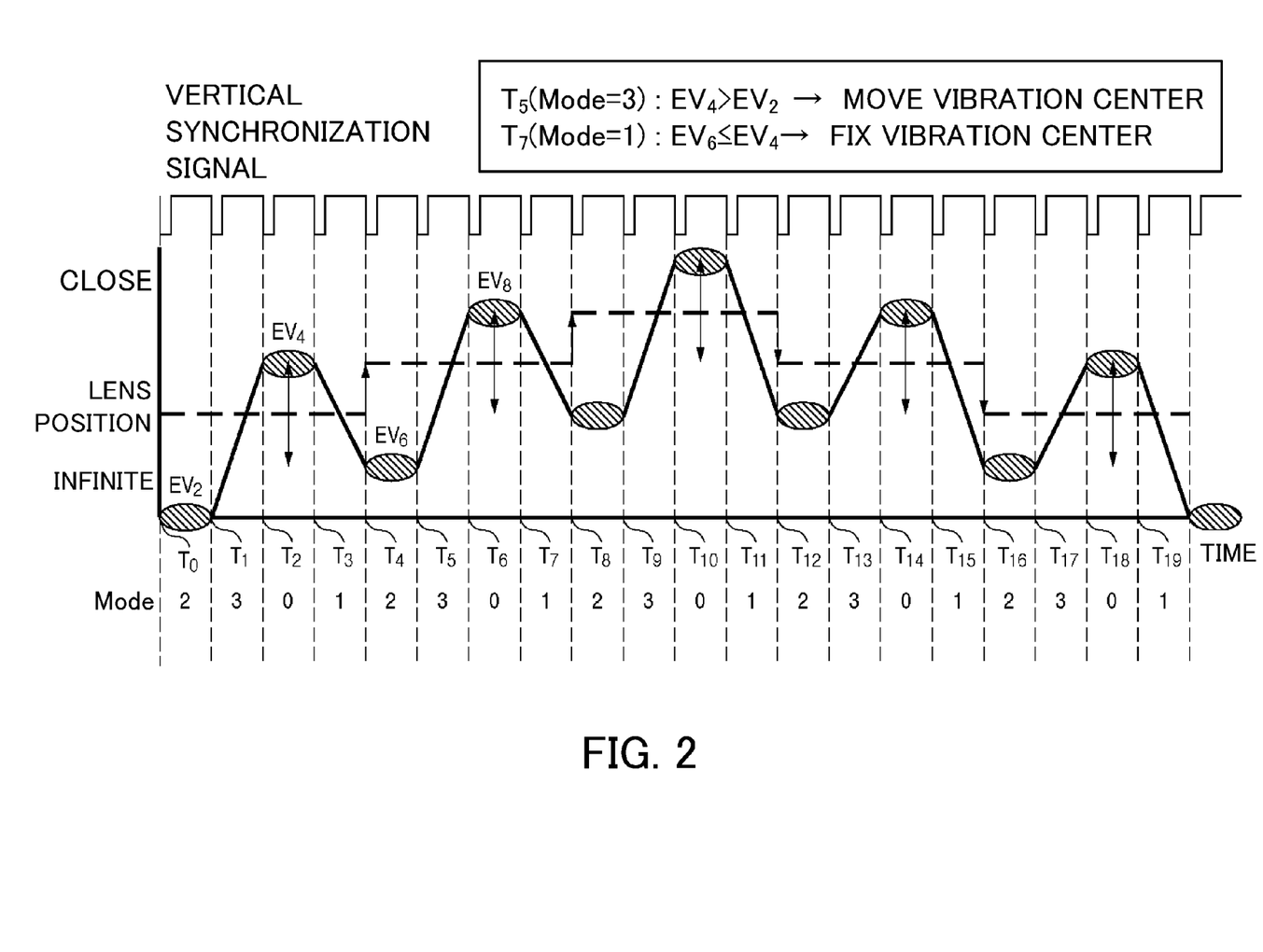
FIG. 2 is a conceptual diagram of a TV-AF method.

FIG. 2 is a conceptual diagram of the TV-AF. In FIG. 2, a horizontal axis indicates a time in which a vertical synchronization signal of the image pickup element 106 is a unit time. A vertical axis indicates a position of the focus lens 105. Reference symbol "Mode" indicates a phase of the process at the time of performing the TV-AF. The following is a specific description.

Mode=0: The AF evaluation value (an infinite side evaluation value) based on electric charges accumulated in the image pickup element 106 when Mode is previously equal to 2 (at this time, the focus lens 105 is positioned at an infinite side in the wobbling) is obtained.

Mode=1: The focus lens 105 is moved from a close side to the infinite side in the wobbling. At this time, a center of the wobbling is also moved to the infinite side in some cases.

Mode=2: The AF evaluation value (the close side evaluation value) based on electric charges accumulated in the image pickup element 106 when Mode is previously equal to 0 (at this time, the focus lens 105 is positioned at the close side in the wobbling) is obtained.

Mode=3: The focus lens 105 is moved from the infinite side to the close side in the wobbling. At this time, the center of the wobbling is also moved to the close side in some cases.

In the example illustrated in FIG. 2, the electric charges accumulated in the image pickup element 106 between times T0 and T1 (Mode=2) are read at a time T2, and an AF evaluation value EV2 at the infinite side is obtained based on the read electric charges. Furthermore, the electric charges accumulated in the image pickup element 106 between times T2 and T3 (Mode=0) are read at a time T4, and an AF evaluation value EV4 at the close side is obtained based on the read electric charges. Because the condition of EV4>EV2 is met, there is a possibility that an in-focus position is at a closer side. Therefore, between times T5 and T6 (Mode=3), the focus lens 105 is moved from the infinite side to the close side as a common wobbling operation, and is also moved to the closer side in order to move the center of the wobbling to the close side. Next, the electric charges accumulated in the image pickup element 106 between times T4 and T5 (Mode=2) is read at a time T6, and an AF evaluation value EV6 at the infinite side is obtained based on the read electric charges. Because the condition of EV6≤EV4 is met, there is no possibility that the in-focus position is at a position closer to the infinite side. Therefore, between times T7 and T8 (Mode=1), the focus lens 105 moves from the close side to the infinite side as a common wobbling operation, but the center of the wobbling does not move. Repeating such operations, a position of the focus lens 105 where the AF evaluation value is peaked is detected.

Figure 3:
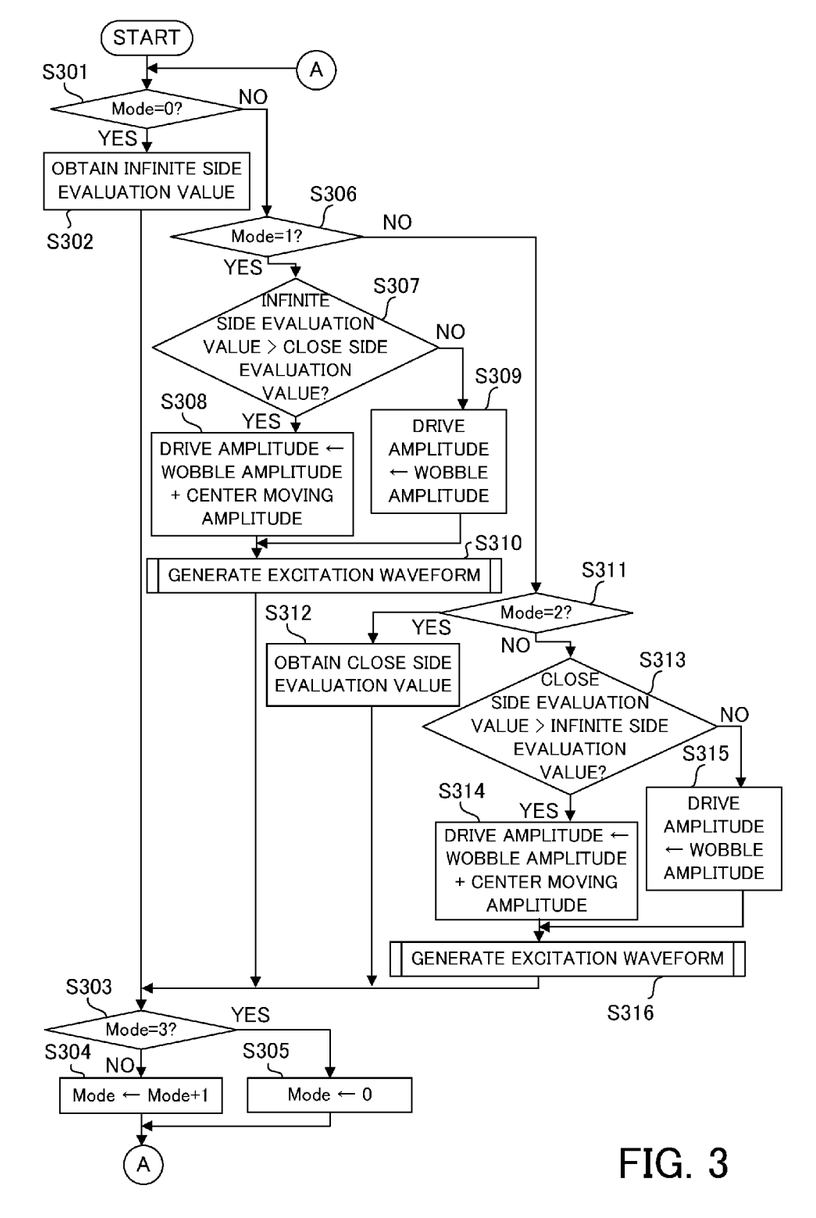
FIG. 3 is a flowchart illustrating the TV-AF method in the first embodiment.

FIG. 3 is a flowchart illustrating the TV-AF in the first embodiment. The process of each step in the flowchart is realized by the camera microcomputer 118 performing a control program. The process in each Mode (see FIG. 2) starts in synchronization with a vertical synchronization signal.

In Step S301, the camera microcomputer 118 determines whether a current Mode is 0. If the current Mode is 0, the process proceeds to Step S302. On the other hand, if not, the process proceeds to Step S306. In Step S302, the camera microcomputer 118 obtains the AF evaluation value at the infinite side. The AF evaluation value is based on the electric charges accumulated in the image pickup element 106 when Mode is previously equal to 2 (in this time, the focus lens 105 is positioned at the infinite side in the wobbling operation).

In accordance with the processes in Steps S303, S304, and S305, the camera microcomputer 118 periodically changes "Mode" like 0, 1, 2, 3, 0, 1, 2, . . . . Then, the process returns to Step S301.

In Step S306, the camera microcomputer 118 determines whether the current Mode is 1. If the current Mode is 1, the process proceeds to Step S307. On the other hand, if not, the process proceeds to Step S311. In Step S307, the camera microcomputer 118 determines whether the infinite side evaluation value obtained in Step S302 is greater than the close side evaluation value obtained when Mode is previously equal to 2 (Step S311 described below). If the value is greater, the process proceeds to Step S308. On the other hand, if not, the process proceeds to Step S309. When the close side evaluation value is not obtained, the process also proceeds to Step S309.

In Step S308, the camera microcomputer 118 sets a drive amplitude so as to be equal to a sum of a wobbling amplitude and a center moving amplitude, i.e. it increases an amount of movement to the infinite side to realize a movement of the center of the wobbling operation to the infinite side. In the embodiment, the wobbling amplitude and the center moving amplitude may also be a fixed value which is previously set. On the other hand, in Step S309, the camera microcomputer 118 sets the drive amplitude so as to be equal to the wobbling oscillation amplitude. The drive amplitude corresponds to the number of driven micro steps.

In Step S310, the camera microcomputer 118 controls the motor driver 111-*b* of the focusing drive unit 111 so as to generate an excitation waveform for performing the wobbling operation (details will be described below with reference to FIG. 5).

In Step S311, the camera microcomputer 118 determines whether the current Mode is 2. If the current Mode is 2, the process proceeds to Step S312. On the other hand, if not, the process proceeds to Step S313. In Step S312, the camera microcomputer 118 obtains the AF evaluation value at the close side. The AF evaluation value is based on electric charges accumulated in the image pickup element 106 when Mode is previously equal to 0, i.e. the focus lens 105 is positioned at the close side in the wobbling operation.

In Step S313, the camera microcomputer 118 determines whether the close side evaluation value obtained in Step S312 is greater than the infinite side evaluation value obtained when Mode is previously equal to 0 (in Step S302 described above). If the value obtained in Step S312 is greater, the process proceeds to Step S314. On the other hand, if not, the process proceeds to Step S315.

In Step S314, the camera microcomputer 118 sets the drive amplitude so as to be equal to a sum of the wobbling amplitude and the center moving amplitude, i.e. it increases an amount of a movement to the close side to realize a movement of the center of the wobbling operation to the close side. On the other hand, in Step S315, the camera microcomputer 118 sets the drive amplitude so as to be equal to the wobbling oscillation amplitude.

In Step S316, the camera microcomputer 118 controls the motor driver 111-*b* of the focusing drive unit 111 so as to generate an excitation waveform for performing the wobbling operation (details will be described below with reference to FIG. 5).

Figure 4:
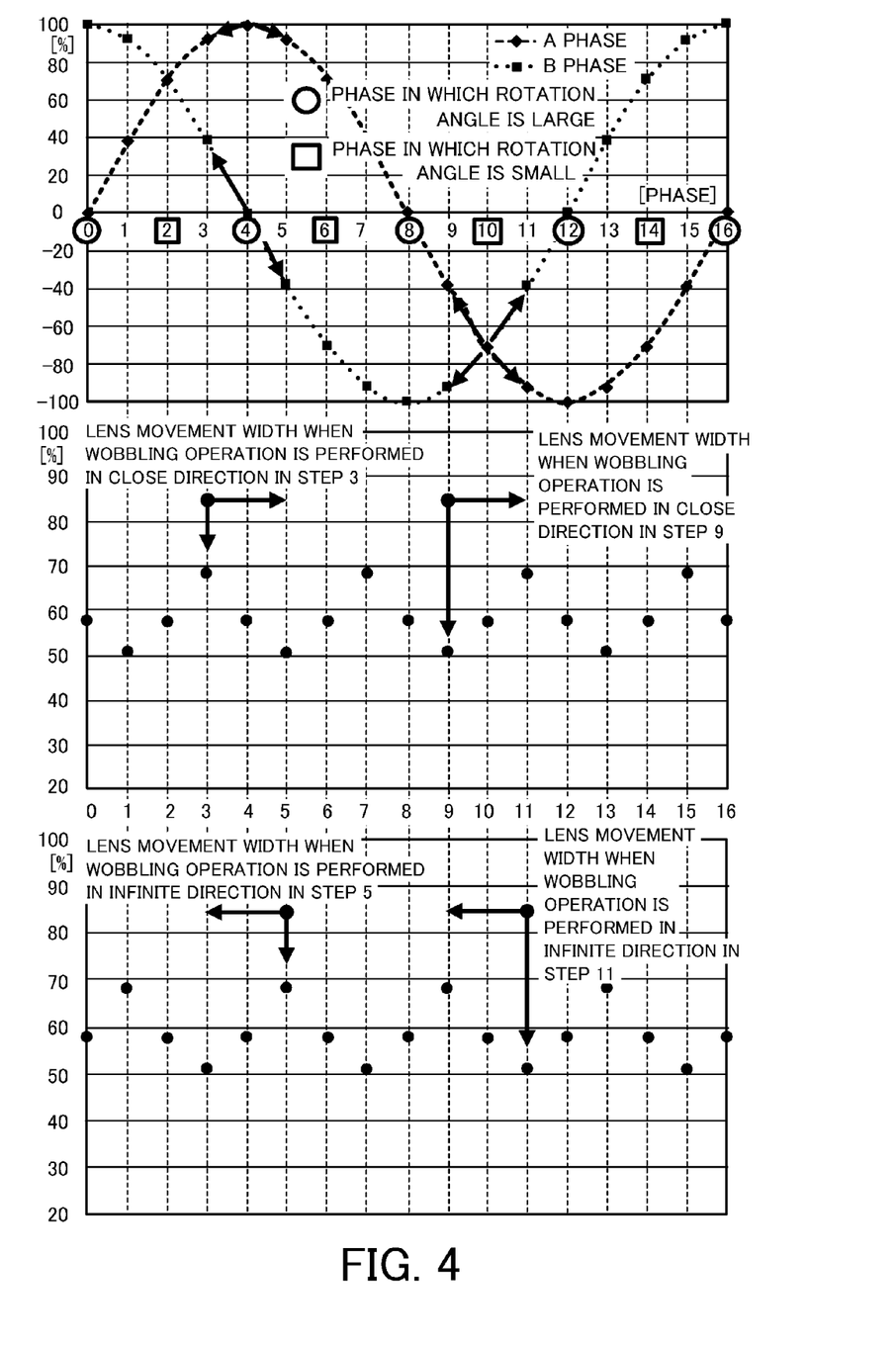
FIG. 4 is a conceptual diagram illustrating a state in which a rotation angle of each micro step of a stepping motor varies in accordance with a step phase.

Next, an excitation waveform generating process in the present embodiment will be described. FIG. 4 is a conceptual diagram illustrating a state in which a rotation angle of each micro step of the stepping motor varies in accordance with a step phase. The excitation of the stepping motor is performed by two phases of an A-phase and a B-phase. An excitation current of each phase has a sinusoidal waveform, and a phase difference between the A-phase and the B-phase is 90 degrees (when one period is expressed as 360 degrees). The phase of the excitation current is minimally changed to be able to perform a micro step drive in which one step of the stepping motor is divided into steps of a predetermined number (a micro step drive having a predetermined division number).

At the upper side of FIG. 4, a horizontal axis indicates a step phase (an excitation angle), and a vertical axis indicates an excitation current. In the example of FIG. 4, one period is divided into 16 steps. At the time of the wobbling operation, a drive control which repeats the movement of the step phase centered around each step phase is performed. In FIG. 4, the change of the excitation waveform when the wobbling amplitude is set to ±1 step is illustrated. The state of the change of the excitation waveform in the wobbling operation in each step phase is different from each other. A rotation angle after the rotation of 1 step from each phase in each phase is different from each other. This is caused by cogging. It is also known that the variation of the rotation angle is generated with ¼ period. In FIG. 4, since the phase that is to be excited is only one phase in the step phases of "0, 4, 8, 12" (0 degree, 90 degrees, 180 degrees, 270 degrees), a bias of a magnetic flux distribution acting on a rotor is reduced and the rotation angle is enlarged. On the contrary, since both two phases are strongly excited in the step phases of "2, 6, 10, 14" (45 degrees, 135 degrees, 225 degrees, 315 degrees), a bias of the magnetic flux distribution acting on the rotor is enlarged and the rotation angle is lowered.

At the middle side and the lower side of FIG. 4, a movement width of the focus lens 105 in a close and finite direction when the stepping motor 111-*a* performs the wobbling operation with an amplitude of two steps from each step phase is illustrated. At the lower side of FIG. 4, a horizontal axis indicates a step phase (an excitation angle), and a vertical axis indicates a movement width of the focus lens 105, which is represented by [%] regarding an ideal movement width as 100%. The movement width does not reach 100% because of a loss of the momentum which is generated in the transmission mechanism (the screw shaft 111-*c* and the rack 111-*d*) and a variation of the rotation angle of the stepping motor 111-*a*. As understood in FIG. 4, a lens movement amount is small in the wobbling operation crossing a phase where the rotation angle of the stepping motor is small (a second phase). On the other hand, the lens movement amount is large in the wobbling operation crossing a phase where the rotation angle is large (a first phase).

Figure 5:
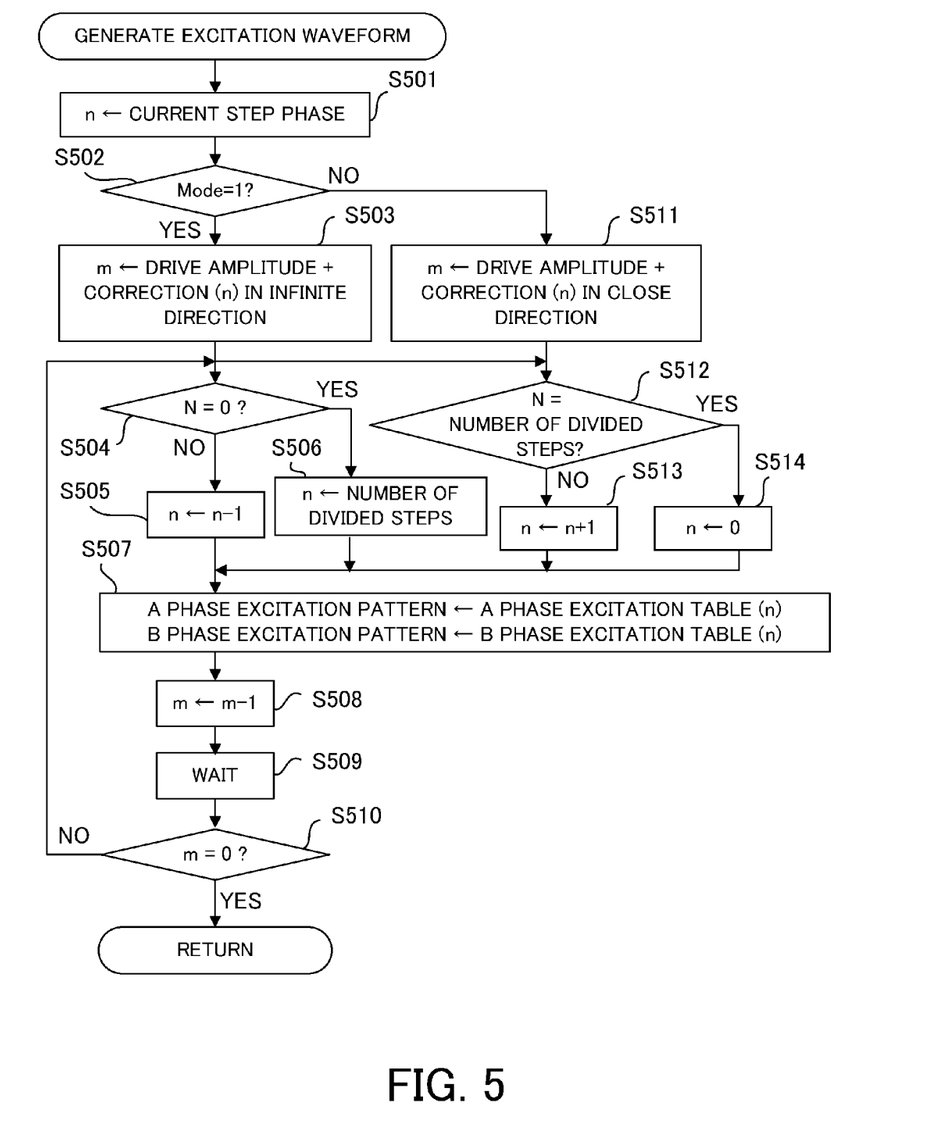
FIG. 5 is a flowchart illustrating details of processes in Steps S310 and S316 of FIG. 3 in accordance with the first embodiment.

FIG. 5 is a flowchart illustrating details of the processes of Steps S310 and S316 in FIG. 3. In Step S501, the camera microcomputer 118 sets the current step phase (the excitation phase) to a variable n. In Step S502, the camera microcomputer 118 determines whether the current Mode is 1. If the current Mode is 1, the process proceeds to Step S503. On the other hand, if not, i.e. if Mode is equal to 3, the process proceeds to Step S511. In Step S503 or S511, the camera microcomputer 118 sets a value obtained by adding a correction (n) in the infinite or close direction to the drive amplitude (the number of micro steps) determined in Step S308, S309, S314, or S315 of FIG. 3 to the variable m. The correction (n) is a correction value prepared for each phase n, which is for example stored in a ROM (not shown) of the camera microcomputer 118 as a table. The correction value is a value that is determined so that the variation of the movement amount of the focus lens in the wobbling operation from each step phase is reduced. Specifically, the correction (n) is set so that an amount of the correction is large in the wobbling operation crossing a phase where the rotation angle of the stepping motor is small and the amount of the correction is small in the wobbling operation crossing a phase where the rotation angle is large. Accordingly, for example, a correction table is defined as follows.
Step Phase
[0,1,2,3,4,5,6,7,8,9,10,11,12,13,14,15]
Correction Value in the Close Direction
[0,1,0,0,0,1,0,0,0,1, 0, 0, 0, 1, 0, 0]
Correction Value in the Infinite Direction
[0,0,0,1,0,0,0,1,0,0, 0, 1, 0, 0, 0, 1]

In Steps 504 to S506, i.e. Mode=1, the camera microcomputer 118 decrements the variable n so as to circulate in a range between zero and the division step number to set a movement target of the focus lens 105 to the infinite side. On the other hand, in Steps S512 to S514, i.e. Mode=3, the camera microcomputer 118 increments the variable n so as to circulate in a range between zero and the division step number to set the movement target of the focus lens 105 to the close side.

In Step S507, the camera microcomputer 118 drives the stepping motor 111-a in accordance with an excitation pattern of the A phase and the B phase corresponding to the step phase n that is the movement target. In Step S508, the camera microcomputer 118 decrements the variable m. In Step S509, the camera microcomputer 118 waits for a predetermined time in order to keep a rotation velocity of the stepping motor 111-a constant. In Step S510, the camera microcomputer 118 determines whether the variable m is 0. If the variable m is 0, the process in the flowchart is finished and returns to FIG. 3 since it means that the movement of the focus lens 105 in a predetermined direction is completed. On the other hand, if the variable is not 0, the process returns to Step S504 (in case of Mode=1) or Step S512 (in case of Mode=3) to repeat the same processes.

Figure 6A:
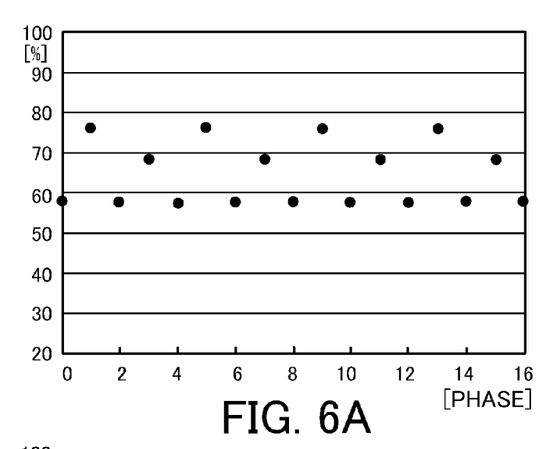
FIGS. 6A to 6D are conceptual diagrams illustrating a movement width of a focus lens after the number of micro steps in a wobbling operation is corrected.
Figure 6B:
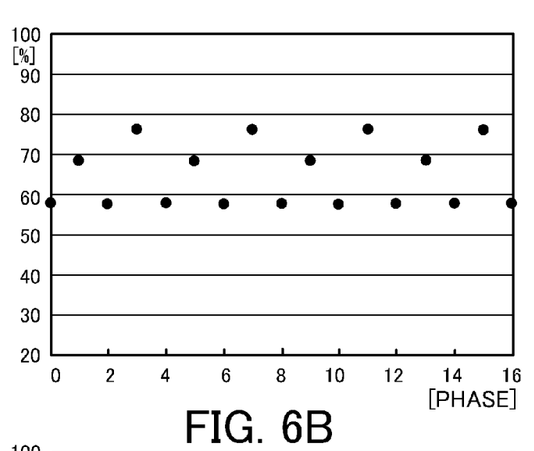

Performing the above processes, for example, the movement width of the focus lens 105 described with reference to FIG. 4 is corrected so as to be illustrated in FIG. 6A in the wobbling operation in the close direction, and FIG. 6B in the wobbling operation in the infinite direction. Because the correction is performed so that the movement width in a phase where the movement width is small increases, the focus lens 105 sufficiently moves in the wobbling operation. If the division number of the excitation waveform is increased to perform a finer micro step drive, "the variation of the movement width" can be further suppressed. For example, when the division number is set to 32, the correction table is defined as follows.
Step Phase
[0,2,4,6,8,10,12,14,16,18,20,22,24,26,28,30]
Correction Value in the Close Direction
[1,2,1,0,1, 2, 1, 0, 1, 2, 1, 0, 1, 2, 1, 0]
Correction Value in the Infinite Direction
[1,0,1,2,1, 0, 1, 2, 1, 0, 1, 2, 1, 0, 1, 2]

Figure 6C:
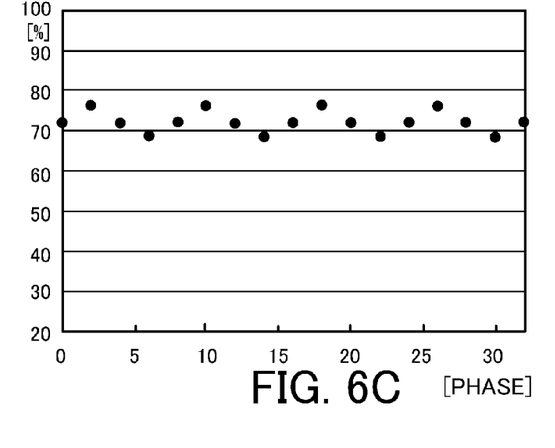
Figure 6D:
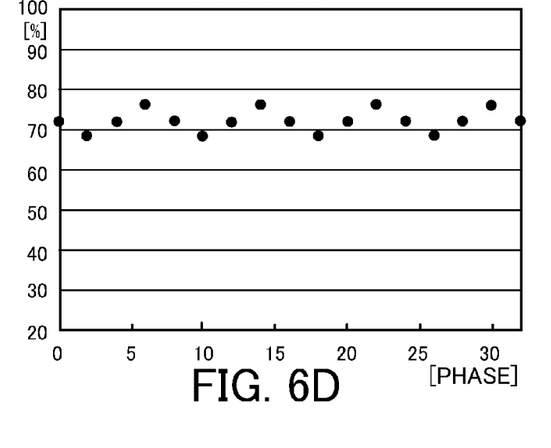

For example, the movement width of the focus lens 105 in this case is corrected as illustrated in FIG. 6C in the wobbling operation in the close direction, and in FIG. 6D in the wobbling operation in the infinite direction.

As described above, according to the present embodiment, the camera microcomputer 118 corrects the number of the micro steps corresponding to the movement width of the focus lens 105 at the time of the wobbling operation in accordance with the step phase. Thus, regardless of the phase, the focus lens 105 is sufficiently moved at the time of the wobbling operation. Furthermore, because the method of the present embodiment does not induce the deterioration of the vibration of the stepping motor, it is suitably used for an image pickup apparatus provided with a microphone that inputs voice.

In the present embodiment, an autofocus control using the focus lens 105 and the focusing drive unit 111 is described as an example, and the drive control of the stepping motor described above can also be applied to other usages. For example, the drive control of the present embodiment can also be applied to a minute movement of the shift lens 104 in a direction perpendicular to the optical axis, which is performed to correct a shake.

In an auto blanket function that is widely provided in an image pickup apparatus such as a video camera or a digital camera, a minute adjustment of an opening degree of the aperture stop is continuously performed. Using the drive control described above, a fine exposure correction can be effectively performed.

In an auto zoom function for keeping the size of an angle of field of an object constant, a minute zoom adjustment using a zoom lens is continuously performed. Using the drive control described above, a highly-accurate auto zoom can be performed.

Second Embodiment

Figure 7:
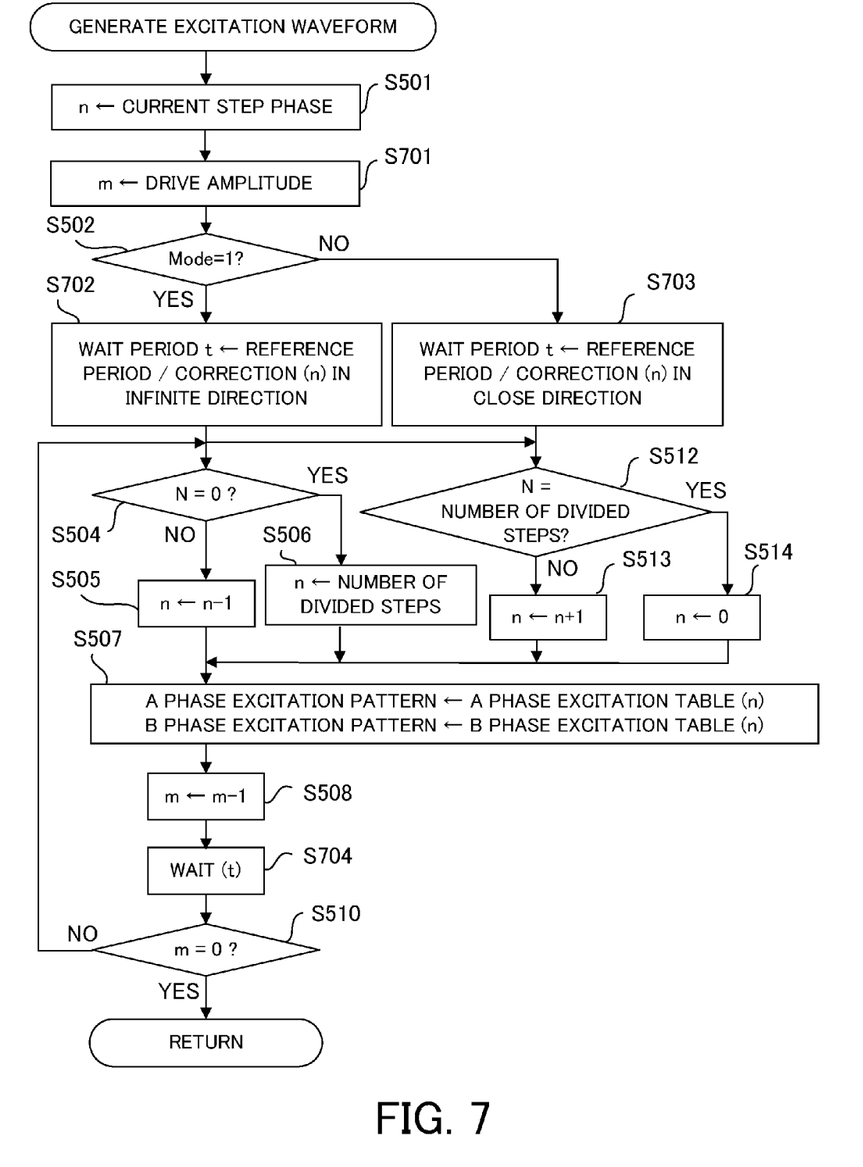
FIG. 7 is a flowchart illustrating details of processes in Steps S310 and S316 of FIG. 3 in accordance with a second embodiment.

The number of the micro steps for the drive at the time of the wobbling operation is corrected in accordance with the step phase in the first embodiment. On the other hand, a rotation velocity of the stepping motor is corrected in accordance with the step phase in a second embodiment. In the present embodiment, instead of the process illustrated in FIG. 5, a process illustrated in FIG. 7 is performed. Hereinafter, processes that are different from those of the first embodiment will be described.

In Step S701, the camera microcomputer 118 sets the drive amplitude (the number of the micro steps) which is determined in Step S308, S309, S314, or S315 of FIG. 3 to the variable m. In the present embodiment, differing from the first embodiment, the correction of the variable m is not performed (see Steps S503 and S511 in FIG. 5).

In Step S702 or S703, the camera microcomputer 118 sets a value obtained by dividing a reference period of a wait period by a correction (n) in the infinite or close direction to a variable t. The correction (n) is a correction value prepared for each phase n, which is for example stored in a ROM (not shown) of the camera microcomputer 118 as a table. The correction value is a value that is determined so that the rotation velocity in a phase where the rotation angle is large is increased, i.e. the wait period is shortened. Specifically, the correction (n) is set so that an amount of the correction is large in the wobbling operation crossing a phase where the rotation angle of the stepping motor is small and the amount of the correction is small in the wobbling operation crossing a phase where the rotation angle is large. Accordingly, for example, a correction table is defined as follows.
Step Phase
[0,1,2,3,4,5,6,7,8,9,10,11,12,13,14,15]
Correction Value in the Close Direction
[1,2,1,1,1,2,1,1,1,2, 1, 1, 1, 2, 1, 1]
Correction Value in the Infinite Direction
[1,1,1,2,1,1,1,2,1,1, 1, 2, 1, 1, 1, 2]

In Step S704, the camera microcomputer 118 waits for the period indicated by the variable t. The variable t is, as described above, selected so that the wait period for each of the step phases "1, 5, 9, 13" in the wobbling operation in the close direction and "3, 7, 11, 15" in the wobbling operation in the infinite direction becomes half of the reference period.

Accordingly, the rotation velocity of the stepping motor 111-a is twice as high as the normal rotation velocity. Thus, kinetic energy needed for the movement of the focus lens 105 is ensured.

As described above, according to the present embodiment, the camera microcomputer 118 corrects the rotation velocity of the stepping motor 111-a at the time of the wobbling operation in accordance with the step phase. Thus, regardless of the phase, the focus lens 105 is sufficiently moved at the wobbling operation. Furthermore, because the method of the present embodiment does not induce the deterioration of the vibration of the stepping motor, it is suitably used for an image pickup apparatus provided with a microphone that inputs voice.

Other Embodiment

The present invention is also realized by performing the following process. In other words, in the process, a software (a program) which realizes the function of each of the above embodiments is provided to a system or an apparatus via a network or each kind of storage media, and a computer (or a CPU, a MPU, or the like) of the system or the apparatus reads the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293209, filed on Dec. 24, 2009, which is hereby incorporated by reference herein in its entirety.

What is claimed is:

1. A drive control apparatus comprising:
a stepping motor capable of performing a micro step drive having a predetermined division number by using a sinusoidal excitation current;
a transmission mechanism configured to transmit an energy generated by a drive of the stepping motor to a focus lens to move the focus lens; and
a controller configured to control the stepping motor so that the number of micro steps of driving in the micro step drive is changed in accordance with a phase of the sinusoidal excitation current without changing the predetermined division number,
wherein the number of micro steps of driving in the micro step drive in a drive crossing a first phase is smaller than that in a drive crossing a second phase where a rotation angle of the stepping motor is smaller than a rotation angle in the first phase.

2. An image pickup apparatus comprising:
a drive control apparatus; and
a autofocus control unit configured to control a movement of a focus lens to perform an autofocus for an object,
wherein the drive control apparatus comprises:
a stepping motor capable of performing a micro step drive having a predetermined division number by using a sinusoidal excitation current;
a transmission mechanism configured to transmit an energy generated by a drive of the stepping motor to the focus lens to move the focus lens; and
a controller configured to control the stepping motor so that the number of micro steps of driving in the micro step drive is changed in accordance with a phase of the sinusoidal excitation current without changing the predetermined division number,
wherein the number of micro steps of driving in the micro step drive in a drive crossing a first phase is smaller than that in a drive crossing a second phase where a rotation angle of the stepping motor is smaller than a rotation angle in the first phase.

3. The drive control apparatus according to claim 2, wherein the autofocus control unit detects a high frequency component as an autofocus evaluation by repeating the movement of the focus lens between a telephoto side and a wide angle side and controls the movement of the focus lens so that the autofocus evaluation value is maximized.

4. A drive control method of a drive control apparatus including a stepping motor capable of performing a micro step drive having a predetermined division number by using a sinusoidal excitation current and a transmission mechanism configured to transmit an energy generated by a drive of the stepping motor to a focus lens to move the focus lens, the drive control method comprising:
a determination step in which a determination portion determines the number of micro steps of driving in the micro step drive;
a correction step in which a correction portion performs a correction of the number of micro steps determined in the determination step in accordance with a phase of the sinusoidal excitation current without changing the predetermined division number, the number of micro steps determined in the determination step in a drive crossing a first phase being smaller than that in a drive crossing a second phase where a rotation angle of the stepping motor is smaller than a rotation angle in a drive crossing the first phase; and
a control step in which a controller controls the stepping motor so that the stepping motor performs micro step drive by the number of the micro steps corrected in the correction step.

5. A non-transitory medium which stores a program of a drive control method to be executed by a computer which controls a drive control apparatus including a stepping motor capable of performing a micro step drive having a predetermined division number by using a sinusoidal excitation current and a transmission mechanism configured to transmit an energy generated by a drive of the stepping motor to a focus lens to move the focus lens, the drive control method comprising:
a determination step in which a determination portion determines the number of micro steps of driving in the micro step drive;
a correction step in which a correction portion performs a correction of the number of micro steps determined in the determination step in accordance with a phase of the sinusoidal excitation current without changing the predetermined division number, the number of micro steps determined in the determination step in a drive crossing a first phase being smaller than that in a drive crossing a second phase where a rotation angle of the stepping motor is smaller than a rotation angle in a drive crossing the first phase; and
a control step in which a controller controls the stepping motor so that the stepping motor performs the micro step drive by the number of the micro steps corrected in the correction step.

* * * * *